United States Patent Office 3,684,436
Patented Aug. 15, 1972

3,684,436
MANUFACTURE OF SODIUM OR POTASSIUM
TRIPOLYPHOSPHATE
William Noel Dear, James Ian Ramsay, and Alexander Thomson, Whitehaven, England, assignors to Albright & Wilson Limited, Oldbury, near Birmingham, Warwickshire, England
Filed July 21, 1970, Ser. No. 56,886
Claims priority, application Great Britain, July 30, 1969, 38,159/69
Int. Cl. C01b 25/30
U.S. Cl. 423—305                    6 Claims

ABSTRACT OF THE DISCLOSURE

A method for the manufacture of alkali metal tripolyphosphate comprising: forming an aqueous solution of alkali metal orthophosphates selected from the group consisting of sodium and potassium orthophosphates and having a concentration between 10% and 40% $P_2O_5$ by weight and an atomic ratio of alkali metal to phosphorus of about 5:3; spray drying between 1/6 and 5/6 of said solution to form a dry mixture of orthophosphates; calcining said mixture in a first rotary kiln at a temperature of between 200° C. and 600° C. until the orthophosphates have been converted to preformed tripolyphosphate having a bulk density of from 0.4 to 0.5; cooling said tripolyphosphate and mixing said cooled tripolyphosphate with the remainder of said aqueous solution of orthophosphates, the cooling being such that the mixture of said cooled tripolyphosphate with said solution has a temperature of less than 120° C.; and heating the mixture in a second rotary kiln at a temperature of 200 to 600° C. until the remainder of the orthophosphates has been converted to tripolyphosphate product.

---

Figure 1:
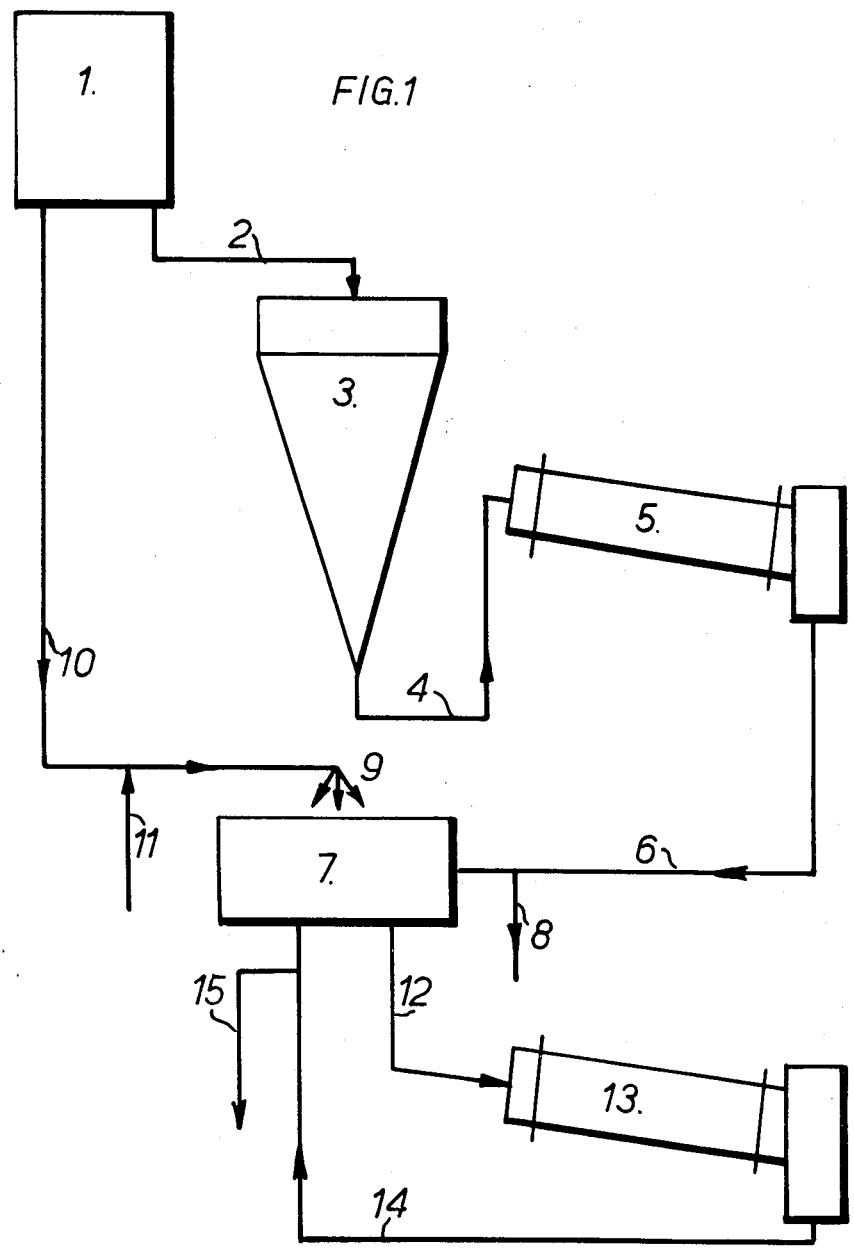

The present invention relates to the manufacture of sodium or potassium tripolyphosphates. It is known to manufacture sodium tripolyphosphate by spray drying a solution of orthophosphate containing approximately 1.67 atoms of sodium per atom of phosphorus to form a solid composition known as "ortho-mix." The ortho-mix is calcined, for example in a rotary kiln at a temperature of from 200 to 600° C. to form sodium tripolyphosphate. Potassium tripolyphosphate may be produced by an analogous method.

It is desirable to produce sodium tripolyphosphate of different bulk densities for different uses. For example, some users demand a "low density" product which usually has a s.g. of from 0.4 to 0.5 other users require "medium density" with an s.g. from 0.6 to 0.8; whereas other consumers require a "high density" product with a s.g. greater than 0.9.

The manufacturing system described above, although generally the best and most widely adopted method for making tripolyphosphate, has two serious disadvantages: it produces an undesirably friable product and it is inflexible with respect to the bulk density of the product. The bulk density has been found to depend primarily on the design of the spray drier. Most U.K. manufacturers have chosen to operate plant adapted to make low density sodium tripolyphosphate and have sought various means of increasing the density of the product for particular requirements.

We have discovered a method of manufacturing sodium or potassium tripolyphosphate which produces a less friable product than hitherto, and which is flexible enough to produce material of density varying from low to medium or higher. A particular advantage of the process is that existing plant can be adapted to operate in accordance therewith. Another advantage is that it can be used to adjust the particle size distribution converting fines to granular material.

Our invention, therefore, provides a method for manufacturing sodium or potassium tripolyphosphate which comprises admixing a preformed tripolyphosphate having a bulk density of less than 0.9 with a solution of orthophosphates adapted to form tripolyphosphate on dehydration and then heating the mixture to a temperature between 200 and 600° C. for a sufficient time to convert the orthophosphate substantially to tripolyphosphate. Preferably the components are kept sufficiently cool during mixing to enable a free-flowing mixture of orthophosphate and hydrated tripolyphosphate to be formed.

Preferably the preformed tripolyphosphate is prepared by calcining a suitable mixture of orthophosphate (e.g. an "ortho-mix" prepared by spray drying a solution of orthophosphates) in, for example, a rotary kiln. The preformed tripolyphosphate is preferably admixed with a recycled part of the final tripolyphosphate product, or may consist of recycled final product. The preformed solids may then be admixed with the orthophosphate solution (e.g. in a spray mixer) and calcined in a suitable apparatus such as a rotary kiln. The mixing and the spraying may be carried out in one vessel or in a mixer blender followed by a spray mixer. A variety of mixing vessels fitted with sprays or similar methods of distributing the solution may be used. For example, a Z-blade mixer or a drum mixer have been found to be satisfactory.

It has been found that the bulk density of the product can be varied by altering the proportion of the final product which is recycled. In general the higher the recycle of the final product, the greater the extent to which the bulk density of the final product is increased over that of the preformed tripolyphosphate. We prefer to preform low bulk density tripolyphosphate. It has been found, however, that material containing a large amount of fines may undergo an initial lowering of the density. This is due to the reduction of the fraction of these fines.

The recycled kilned product may be cooled before mixing with the orthophosphate solution, e.g. by indirect cooling. However, a higher thermal efficiency may be obtained by spraying the orthophosphate solution onto the hot tripolyphosphate. The preferred condition is that the tripolyphosphate-orthophosphate in the spray mixer is brought to a temperature (less than 120° C.) at which hydration of the tripolyphosphate can take place. However, even if the temperature is only reduced to 200° C., at which temperature hydration cannot take place, the process still works.

Typically the process comprises manufacturing a solution containing a mixture of orthophosphates, for example by neutralising phosphoric acid with alkali, such as sodium carbonate. The purified orthophosphate solution may have a composition corresponding to that normally employed in the manufacture of tripolyphosphate, i.e. a ratio of Na or K:P of approximately 1.67 and a $P_2O_5$ concentration of approximately 30% by weight. This composition may be varied quite widely within certain economic constraints. For example, as the concentration of the solution is reduced below about 25% $P_2O_5$, the cost of evaporating the water becomes insupportable, and it is unlikely that any commercially successful process would be operated below about 10% $P_2O_5$. Solutions much more concentrated than 30% $P_2O_5$ may be employed, e.g. up to 60% or more, but the increased cost of the concentrated phosphoric acid and the increased viscosity, with consequent difficulties of handling and spraying make operation at more than about 30% $P_2O_5$ initial concentration commercially unattractive. It is unlikely that a commercial attempt would be made to spray dry or spray mix a solution having an initial concentration higher than about 40% $P_2O_5$.

Pure tripolyphosphate has a theoretical proportion of alkali metal to phosphorus of 5:3 and the solutions employed in practice usually conform as closely to this ratio as industrial circumstances permit in order to maximise the yield of tripolyphosphate. For some purposes, however, mixtures of tripolyphosphate with other condensed phosphates, especially pyrophosphates, are satisfactory or preferred. It is therefore possible according to our invention to employ atomic ratios either higher or lower than the stoichiometric figure for pure tripolyphosphate, provided the mixture is capable of forming a product containing a substantial proportion (e.g. more than 20% by weight) of tripolyphosphate, and preferably a major proportion, upon suitable calcination.

Preferably approximately ½ (e.g. from ⅙ to ⅚) of the orthophosphate solution is used to make the preformed tripolyphosphate and the remainder is mixed with the preformed and recycled products. The solution for making the preformed tripolyphosphate may be spray dried to form ortho-mix and the ortho-mix may be calcined in a rotary kiln. The preformed tripolyphosphate may be cooled before use or cooled in the process by the addition of the orthophosphate solution in the spray mixer.

The preformed tripolyphosphate preferably has a bulk density of less than 0.6, e.g. 0.4 to 0.5. It may be admixed with any recycled final product whether before or after admixture with the remainder of the orthophosphate solution. Preferably the preformed and recycled materials are blended and then spray mixed with the orthophosphate solution. The orthophosphate solution can act as a coolant if desired, in addition to supplying hydration water for the preformed and recycled tripolyphosphates. In this case it is prefered to blend the hot tripolyphosphates together and spray them.

When the orthophosphates are sprayed onto previously cooled tripolyphosphate products, it is preferred that the total amount of water in the solution supplied to the spray mixer should not be more than six moles per mole of solid tripolyphosphate so that the mixed phosphates contain no free water prior to calcination, but comprise a solid mixture of orthophosphate, tripolyphosphate and tripolyphosphate hexahydrate.

When the orthophosphates are sprayed onto hot tripolyphosphates, however, some additional solution may be added to compensate for water lost by evaporation.

It is within the scope of the invention to blend hot recycled tripolyphosphate with previously directly or indirectly cooled preformed tripolyphosphate or tripolyphosphate/orthophosphate mixture, and this may in some circumstances be the preferred method of operation, e.g. in the recovery of waste fines.

The final mixture of orthophosphate and tripolyphosphate is calcined in a rotary kiln.

The orthophosphate and tripolyphosphate may be spray mixed within a wide range of temperatures, but preferably the material should leave the spray mixer at less than 120° C., e.g. 70–90° C. At this temperature the hydration of the tripolyphosphate will be substantially completed. Temperatures in excess of 120° C. are not precluded however. For example, spraying orthophosphate solution onto the recycled tripolyphosphate-preformed tripolyphosphate mixture so that the temperature is reduced to 200° C. will work. Under these conditions, however, the tripolyphosphate does not hydrate. The use of the hydration step allows for a much larger liquor addition with good control of the particle size and bulk density.

The conditions of calcination both of the preformed and final products may be in accordance with normal commercial practice, i.e. at 300 to 500° C. for 15 to 30 minutes. The temperature may be used to control the ratio of phase 1 to phase 11 crystal forms in the product. Times shorter than 15 minutes may be employed if the temperature is sufficiently high to form a substantial proportion of tripolyphosphate. Times of up to about five hours or even longer could, theoretically, be employed, but in practice it is unlikely that any benefit would be gained by heating for more than one hour. The reaction may be catalysed by maintaining an atmosphere of water vapour.

In order to obtain a medium density final product, when the preformed material is of low density, it is preferred to recycle 1 to 2 parts by weight of the final product for every part withdrawn from the system. Higher or lower recycle rates may be used if a higher or lower final bulk density is required.

In practice some oversize particles may be formed. These may be screened out and crushed in a hammer mill. This operation may be carried out on the recycled tripolyphosphate or on the medium density product. The crushed oversize may be used as such or returned to the spray mixer.

In this process orthophosphate solution is used in the spray mixing as this gives an increased production of tripolyphosphate. The solution may, however, also contain tripolyphosphate or any other combination of phosphates which would give the required stoichiometry of the end product, e.g. mixtures of orthophosphate and pyrophosphate.

The separate preparation of preformed tripolyphosphate has been described. It is also within the scope of this invention to use a blend of solid ortho-mix and recycled tripolyphosphate directly in the spray mixer once the recycle has been established. In this case only the recycled tripolyphosphate will hydrate to hexahydrate and the ortho-mix will be converted to relatively low density tripolyphosphate in passing with the hexahydrate to the kiln. The average bulk density of the mixed product will be medium density. This method has advantages in requiring only one kiln. The process is started by passing ortho-mix to the one kiln for conversion to tripolyphosphate. This material is then passed to the spray mixer and the recycle established. The disadvantage of one kiln operation as described is that there is no product stream of low density tripolyphosphate.

The processes specifically described so far are continuous, but it is within the scope of this invention to carry out the process as a batch reaction and for that matter in a single reactor which can operate as a spray mixer and kiln. For example, a rotating steel drum may be directly or indirectly heated to form tripolyphosphate from the spray dried ortho-mix. The heating is then removed and the hot product (300–500° C.) is then sprayed with orthophosphate solution until it is cooled and hydrated to the hexahydrate (70–90° C.). The heating is then restored to convert the spray mixed material to tripolyphosphate. This operation is repeated with or without adding spray dried ortho-mix or preformed tripolyphosphate to the densified material in the rotating drum.

The invention is illustrated by the following examples:

EXAMPLE 1

With reference to the drawing FIG. 1 which is a diagrammatic flow sheet: The sodium orthophosphate solution as prepared in normal processing, reasonably free from impurities, is held in heated storage 1 at 30% $P_2O_5$. A line 2 carried the solution to a spray drier 3 from which a conveyor 4 carried dried ortho-mix to a rotary kiln 5.

Preformed sodium tripolyphosphate is conveyed and cooled by means of water cooled conveyors 6 to a water cooled spray mixer 7. A chute 8 is provided after the conveyor coolers for withdrawal of the preformed low density sodium tripolyphosphate as required. A spray 9 is supplied by line 10 after dilution with water (or dilute orthophosphate solution) from line 11. This spray brings about the hydration in the spray mixer 7. Water cooling is used as required to maintain a low temperature. The mixed phosphates from the spraying and mixing are passed by a conveyor 12 to a rotary kiln 13. A water cooled conveyor 14 cools and transports sodium tripolyphosphate from kiln 13 to the spray mixer 7. A chute 15 is provided for withdrawal as final product of part of the sodium tripolyphosphate from the conveyor 14.

Phosphoric acid is neutralised with sodium carbonate and impurities are removed by filtration as in normal processing. The orthophosphate solution with its Na/P ratio correctly adjusted to 1.67 is concentrated to 30% $P_2O_5$ and held in the storage 1 at 100° C. for feeding to the process.

This orthophosphate solution from storage 1 is fed through line 2 to the spray drier 3 and dried to form ortho-mix, which is calcined in the rotary kiln 5 to form sodium tripolyphosphate of bulk density 0.48. The sodium tripolyphosphate is cooled and conveyed by conveyors 6 to the spray mixer 7 or it may be withdrawn as product after cooling from chute 8. The recycled material from kiln 13 is cooled and conveyed by conveyor 14 to the spray mixer 7 where it is blended with material from conveyor 6 and sprayed with orthophosphate solution from spray 9, which is supplied by line 10. The concentration of the solution has been adjusted to 25% $P_2O_5$ by addition of water from line 11 before it is sprayed from spray 9. The mixed solids from the spray mixer 7 are passed via the conveyor 14 to the kiln 15 and converted to the sodium tripolyphosphate, part of which is withdrawn via the chute 15 and the remainder recycled by the conveyor 14 to the spray mixer 7.

The above plant was operated passing 1 part of orthophosphate solution through the line 2 to spray drier 3 and 1.18 parts through the line 10 with dilution from line 11 to the spray mixer 7. No low density product was withdrawn from the chute 8. The proportion of the tripolyphosphate recycled to the spray mixer through the line 14 to that withdrawn through chute 15 was in the ratio of 1.78:1. This gave a medium density granular product with a bulk density of 0.7 which was rather more resistant to attrition (less friable) than standard granular materials obtained by separation for the low density product over that in the preformed sodium tripolyphosphate as shown by the following sieve analysis:

Preformed sodium tripolyphosphate

| | Percent |
|---|---|
| Retained 25 B.S.S. | 2.1 |
| —25+36 B.S.S. | 10.8 |
| —36+60 B.S.S. | 24.0 |
| —60+100 B.S.S. | 26.2 |
| —100 B.S.S. | 37.0 |

Densified sodium tripolyphosphate

| | Percent |
|---|---|
| Retained 25 B.S.S. | 20.3 |
| —25+36 B.S.S. | 27.3 |
| —36+60 B.S.S. | 31.0 |
| —60+100 B.S.S. | 15.3 |
| —100 B.S.S. | 6.1 |

EXAMPLE 2

Figure 2:
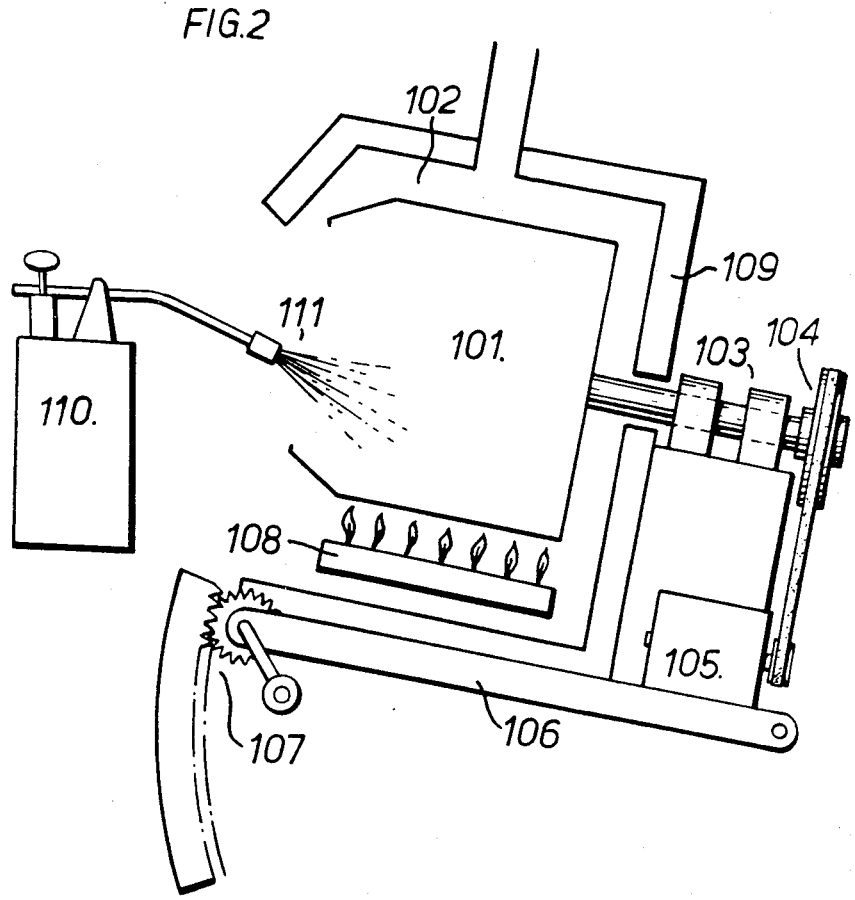

With reference to FIG. 2 which is a diagrammatic cross section of simple apparatus suitable for batch operation according to the invention. The apparatus comprises a rotatable steel drum 101, 2 ft. in diameter and 2 ft. deep, which is located within a furnace 102. The drum is mounted upon a rotatable shaft 103 which may be driven by gears 104 and motor 105. The whole is mounted on a platform 106 which is hinged at the end adjacent to the base of the drum and is capable of being raised or lowered by means of a rack and pinion 107 at the other end whereby the drum may be lifted to retain or remove its contents.

Heating may be applied to the drum by means of a gas burner 108 which can be turned on and off at will. Heat losses are minimised by the insulation 109. Orthophosphate liquor is stored in a pressurised spray vessel 110 which can be used as desired to spray orthophosphate solution onto tripolyphosphate held in the rotating drum 101 by way of the spray nozzle 111.

4000 g. of preformed sodium tripolyphosphate from sprayed onto the tripolyphosphate until the temperature density of 0.46, was placed in the drum 101 and heated by means of the gas burner 108. When the temperature of the tripolyphosphate was 300° C., sodium orthophosphate solution with an Na:P ratio=1.67 and concentration equivalent to 24% $P_2O_5$ in the spray vessel 110 was sprayed onto the tripolyphosphate until the temperature was reduced to about 100° C. By weighing spray vessel 10 it was known that 2080 g. of solution had been transferred onto the tripolyphosphate in the drum 101. The drum 101 was allowed to rotate for another 10 minutes. When the temperature dropped by natural cooling to 70° C. While still rotating the drum 101 it was again heated by means of the gas burner 108 until a temperature of 470° C. was reached. The gas was then turned off and rotation of the drum 101 continued until the temperature was reduced to 100° C. A sample was then withdrawn of the product and examined after further natural cooling.

The sample had a bulk density of 0.55 and was less friable than the original preformed sodium tripolyphosphate. The produce was more granular than the original as shown by the following sieve analyses:

Preformed sodium tripolyphosphate

Bulk density=0.46

| | Percent |
|---|---|
| Retained 25 B.S.S. | 2.1 |
| —25+36 B.S.S. | 10.8 |
| —36+60 B.S.S. | 24.0 |
| —60+100 B.S.S. | 26.2 |
| —100 B.S.S. | 37.0 |

Densified sodium tripolyphosphate

Bulk density=0.55

| | Percent |
|---|---|
| Retained 25 B.S.S. | 17.0 |
| —25+36 B.S.S. | 17.3 |
| —36+60 B.S.S. | 31.0 |
| —60+100 B.S.S. | 24.7 |
| —100 B.S.S. | 10.0 |

A total of 4880 g. of this product of density 0.55 was obtained on tipping the drum 101 off the rack and pinion 107. Starting with 2800 g. of this product in the drum 101 and adding 1200 g. of the preformed sodium tripolyphosphate of bulk density 0.46, the drum 101 was rotated by means of the gas burner 108 to a temperature of 470° C. 2600 g. of sodium orthophosphate solution (24% $P_2O_5$ as before) was sprayed from the spray vessel 110 onto the tripolyphosphate in the drum 101 until the temperature was reduced to about 100° C. The drum 101 was allowed to rotate for a further ten minutes when the temperature dropped by natural cooling to 80° C. While still rotating the drum 101 it was again reheated by means of the gas burner 108 until a temperature of 470° C. was reached and held for 15 minutes. The gas was then turned off and the drum 101 continued to rotate until the temperature was reduced to 100° C. The whole contents of the drum 101 were then removed by tilting the drum by means of the rack and pinion 107. A total of 5070 g. of product tripolyphosphate was produced with a bulk density of 0.65 and the following sieve analysis:

| | Percent |
|---|---|
| Retained 25 B.S.S. | 13.0 |
| −25+36 B.S.S. | 18.7 |
| −36+60 B.S.S. | 37.9 |
| −60+100 B.S.S. | 23.8 |
| −100 B.S.S. | 6.7 |

This product was also resistant to attrition.

EXAMPLE 3

Figure 3:
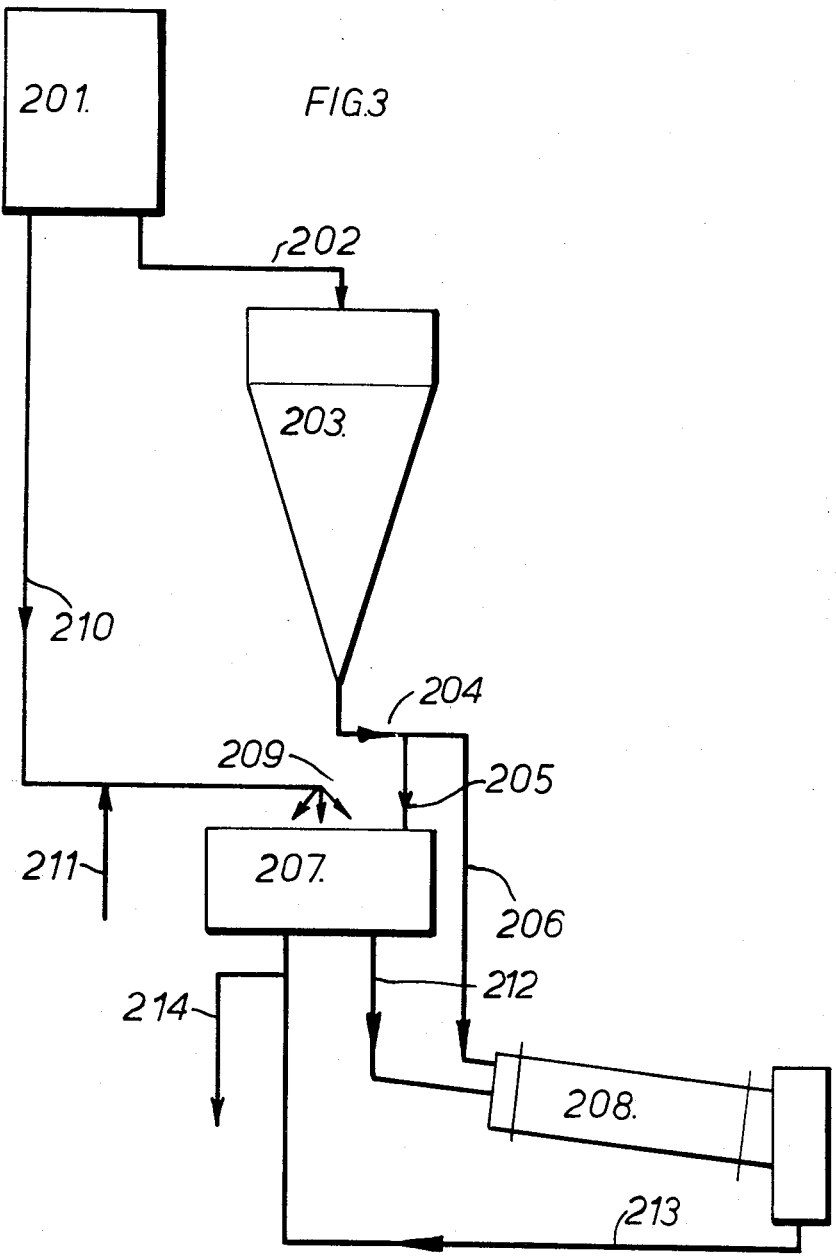

With reference to the drawing, FIG. 3, which is a diagrammatic flow sheet: the orthophosphate solution is prepared and held in storage 201 at 30% $P_2O_5$. A line 202 carries the solution to a spray drier 203 from which a conveyor 204 carries dried ortho-mix either to the spray mixer 207 via the line 205 or the rotary kiln 208 via the line 206. A spray 209 is supplied by line 210 after dilution with water (or dilute orthophosphate solution) from line 211. This spray 209 brings about the hydration in the spray mixer 207. The mixed phosphates from the spraying and mixing are passed by conveyor 212 to the rotary kiln 208. A conveyor 213 transports the hot tripolyphosphate from the kiln 208 to the spray mixer 207. A water cooled conveyor and chute 214 is provided to cool and withdraw as final product part of the recycled tripolyphosphate from the conveyor 213.

Orthophosphate solution with its ratio adjusted to 1.67 and concentration at 30% $P_2O_5$ is held in storage at 100° C. as in Example 1 for feeding to the process. This orthophosphate solution from storage 201 is fed through line 202 to the spray drier 203 and dried to ortho-mix. The ortho-mix is then conveyed to the kiln 208 via conveyors 204 and 206. Calcined tripolyphosphate is produced in the kiln 208 and is recycled hot via conveyor 213 to the spray mixer 207. Orthophosphate solution from line 210 is diluted with water from line 11 to 25% $P_2O_5$ and fed to the spray 209 of the spray mixer 207. The sprayed orthophosphate solution cools the hot tripolyphosphate down to 70–90° C. with some considerable evaporation of water and provides the water for the hydration of the tripolyphosphate. The hydrated material then passes via the conveyor 212 to the kiln 208 where it mixes with the incoming stream of spray dried ortho-mix and the blend is converted to anhydrous granular tripolyphosphate. 2 parts by weight of the tripolyphosphate from the conveyor 213 are cooled and withdrawn as product by means of the water cooled conveyor and chute 214 for every 1 part of tripolyphosphate from the spray drier and 2.4 parts are recycled to the spray mixer 207.

In a minor variation of this process the spray dried ortho-mix is fed via the spray mixer 207 to the kiln 208 by means of the conveyors 204 and 205.

In the example in which the spray dried material was routed via conveyors 204 and 206 to the kiln 208 it was found that for every part of orthophosphate passing through the spray drier 203 an equal part of orthophosphate solution could pass via line 210 to the spray mixer 207.

For every part of tripolyphosphate coming from the spray drier 2.4 parts pass along the conveyor 213. The temperature in the kiln 208 was 470° C. and the temperature in the spray mixer 207 was 83° C. The product withdrawn from the cooler and chute 214 had a bulk density of 0.73 and was resistant to attrition. It was granular material with the following sieve analysis:

| | Percent |
|---|---|
| Retained 25 B.S.S. | 24.7 |
| −25+36 B.S.S. | 21.4 |
| −36+60 B.S.S. | 24.4 |
| −60+100 B.S.S. | 17.7 |
| −100 B.S.S. | 11.8 | i.e. it was realtively free from fines.

EXAMPLE 4

This process uses a flow diagram identical with FIG. 1, but conveyor 6 is not cooled. The spray mixer 7 is not cooled. The chute 8 is provided with means of cooling the product to obtain the low density tripolyphosphate. The conveyor 14 is not cooled and the chute 15 is preceded with a water cooled conveyor to cool the final product.

The processing is as in Example 1 except that the conveyors now do not abstract heat from the medium and low density tripolyphosphates from kilns 5 and 13.

In this example it was found that for every part of orthophosphate passing through the spray drier 3 an equal part of orthophosphate solution could pass via the line 10 to the spray mixer 7. For every part of tripolyphosphate coming from the spray drier 4.3 parts passed along the conveyor 14. Of these, 2 parts were taken off as product and 2.3 parts were recycled to the spray mixer. The temperature in the spray mixer 7 was 79° C. The product withdrawn from the cooler and chute 15 had a bulk density of 0.72 and was resistant to attrition.

It was granular material with the following sieve analysis:

| | Percent |
|---|---|
| Retained 25 B.S.S. | 36.6 |
| −25+36 B.S.S. | 36.2 |
| −36+60 B.S.S. | 20.8 |
| −60+100 B.S.S. | 4.6 |
| −100 B.S.S. | 1.8 | i.e. it was very free from fines.

We claim:

1. A method for the manufacture of alkali metal tripolyphosphate comprising:
   forming an aqueous solution of alkali metal orthophosphates selected from the group consisting of sodium and potassium orthophosphates and having a concentration between 10% and 40% $P_2O_5$ by weight and an atomic ratio of alkali metal to phosphorus of about 5:3;
   spray drying between ⅛ and ⅝ of said solution to form a dry mixture of othophosphates;
   calcining said mixture in a first rotary kiln at a temperature of between 200° C. and 600° C. until the orthophosphates have been converted to preformed tripolyphosphate having a bulk density of from 0.4 to 0.5;
   cooling said tripolyphosphate and mixing said cooled tripolyphosphate with the remainder of said aqueous solution of orthophosphates, the cooling being such that the mixture of said cooled tripolyphosphate with said solution has a temperature of less than 120° C.; and
   heating the mixture in a second rotary kiln at a temperature of 200 to 600° C. until the remainder of the orthophosphates has been converted to tripolyphosphate product.

2. A method according to claim 1 wherein a portion of said tripolyphosphate product is recycled and admixed with said preformed tripolyphosphate.

3. A method according to claim 2 wherein from a half to two-thirds of said tripolyphosphate product is recycled.

4. A method according to claim 3 wherein said alkali metal is sodium.

5. A method according to claim 1 wherein the solution of orthophosphates which is mixed with said preformed tripolyphosphate prior to calcination in the second rotary calciner contains less than 6 mols of water per mol of said preformed tripolyphosphate.

6. A method according to claim 5 wherein said alkali metal is sodium.

References Cited

UNITED STATES PATENTS

| | | | |
|---|---|---|---|
| 2,977,317 | 3/1961 | Rodis et al. | 23—106 A |
| 2,898,189 | 8/1959 | Rodis et al. | 23—106 A X |
| 3,030,180 | 4/1962 | Bigot | 23—106 A |
| 3,210,154 | 10/1965 | Klein et al. | 23—106 A |
| 3,233,967 | 2/1966 | Shen | 23—106 A |
| 3,336,104 | 8/1967 | Miller | 23—106 R X |
| 3,437,434 | 4/1969 | Sproul et al. | 23—106 |

OSCAR R. VERTIZ, Primary Examiner

C. B. RODMAN, Assistant Examiner

UNITED STATES PATENT OFFICE
CERTIFICATE OF CORRECTION

Patent No. 3,684,436          Dated August 15, 1972

Inventor(s)   W. N. DEAR et al

It is certified that error appears in the above-identified patent and that said Letters Patent are hereby corrected as shown below:

Delete Fig. 3 which is Sheet 3 of the drawings.

Column 4, lines 37, 52, delete all of the subject matter on these lines;

Column 7, lines 13--75, delete all of the subject matter on these lines; and

Column 8, line 1, delete "EXAMPLE 4".

Signed and sealed this 13th day of February 1973.

(SEAL)
Attest:

EDWARD M. FLETCHER, JR.
Attesting Officer

ROBERT GOTTSCHALK
Commissioner of Patents